United States Patent [19]

Mabuchi

[11] 4,319,153

[45] Mar. 9, 1982

[54] ELECTRIC MOTOR WITH CONTROLLABLE MECHANICAL WEAR AND SPARK GENERATION

[75] Inventor: Takaichi Mabuchi, Matsudo, Japan

[73] Assignee: Mabuchi Motor Co. Ltd., Tokyo, Japan

[21] Appl. No.: 27,005

[22] Filed: Apr. 4, 1979

[30] Foreign Application Priority Data

Apr. 18, 1978 [JP] Japan .................................... 5345570

[51] Int. Cl.[3] ............................................ H02K 13/10

[52] U.S. Cl. ...................................... 310/221; 310/233

[58] Field of Search ................. 310/238, 228, 40 MM, 310/45, 233-237, 220-222, 248-252, 231, 232; 339/5 L, 8 L; 184/6.25

[56] References Cited

U.S. PATENT DOCUMENTS

| | | | |
|---|---|---|---|
| 2,269,614 | 1/1942 | Von Soden | 310/228 |
| 2,306,028 | 12/1942 | Conradty | 310/236 |
| 2,555,997 | 6/1951 | Portail | 310/232 UX |
| 2,758,229 | 8/1956 | Perry | 310/233 |
| 2,805,350 | 9/1957 | Parriss | 310/228 |
| 3,475,635 | 10/1969 | Mabuchi | 310/248 |
| 3,564,168 | 2/1971 | Bigg | 310/232 |
| 3,614,726 | 10/1971 | Richter | 310/249 |
| 4,037,125 | 7/1977 | Aoki | 310/40 MM |

*Primary Examiner*—R. Skudy

[57] ABSTRACT

A small electric motor having a plurality of commutator arcuate segments equally spaced in the direction of angular position on the rotating shaft of motor rotor, wherein conductive grease is coated on the commutator arcuate segments and the equally spaced gaps, and edges provided on the sliding portions of brushes are caused to press and contact the commutator by cutting the conductive grease film.

4 Claims, 2 Drawing Figures

ELECTRIC MOTOR WITH CONTROLLABLE MECHANICAL WEAR AND SPARK GENERATION

BACKGROUND OF THE INVENTION

1. Field of the Invention

This invention relates generally to a small electric motor, and more specifically to a small electric motor wherein a commutator surface comprising commutator arcuate segments and gaps interposed between the commutator pieces at equal intervals is coated with conductive grease to reduce mechanical friction by reducing the pressure of brushes on the commutator surface as well as to reduce spark generation.

2. Description of the Prior Art

In general, brushes of a small electric motor have been adapted to exert a relatively large pushing force on a commutator by means of elasticity of the brushes themselves or other external resilient materials so that the sliding portions of the brushes are not unwantedly skipped at the contact points with the commutator. However, in a state where the brush sliding portions are pushed onto the commutator with a large force, unwanted friction loss is caused on the motor commutator and the brushes themselves tend to be rapidly worn out. On the other hand, if the pushing force is reduced, the brushes tend to skip, as described above, increasing electrical wear due to sparks generated by poor electrical contact. In selecting the brush pressure, therefore, the optimum range of the brush pressure is usually determined, taking into account conflicting requirements to prevent mechanical wear and electrical wear, as described above. In a small electric motor using metal brushes, the commutator surface is often coated with grease to prevent the unwanted skipping of the brushes while minimizing the abovementioned mechanical wear. In such a case, edges are provided on the brushes to cut the dielectric grease film to prevent decrease in conductivity between the brushes and the commutator caused by the presence of grease film.

As described above, grease coating is an effective method, but it requires sufficient brush pressure to cause the edges to cut the grease film. This cannot necessarily reduce the abovementioned mechanical wear at the sliding portions where the brushes contact the commutator surface.

SUMMARY OF THE INVENTION

The first object of this invention is to provide a small electric motor in which conductive grease is used to reduce the mechanical wear of the commutator surface and to eliminate electrical wear due to sparks generated by the skipping of the brushes.

The second object of this invention is to provide a small electric motor in which electric resistance of a predetermined value within the optimum range is provided between each commutator arcuate segment by filling the equally spaced gaps between each commutator arcuate segment with the conductive grease to electrically bridge the commutator arcuate segments to prevent spark generation in the commutator and the resultant electrical noises.

The third object of this invention is to provide a small electric motor in which a conductive grease, which is free of metallic powders, carbon, graphite and other conductive fine particles and has in itself an electric resistance on the order of 35 kΩ-cm, for example, is coated on the commutator surface to prevent the aforementioned spark generation and the wear of the commutator surface.

The fourth object of this invention is to provide a small electric motor in which the electric resistance of the conductive grease is adjusted to have a value of 4 kΩ-cm or less, for example, by adding carbon, graphite and other conductive fine particles.

The fifth object of this invention is to provide a small electric motor in which metal brushes are used and edges provided on their sliding portions are adapted to contact the commutator surface by cutting the conductive grease film to prevent the unwanted skipping of the brushes and the decrease in conductivity between the brushes and the commutator surface.

These and other features and advantages of the invention will become apparent by referring to the following description and accompanying drawings.

DETAILED DESCRIPTION OF THE EMBODIMENT

Figure 1:
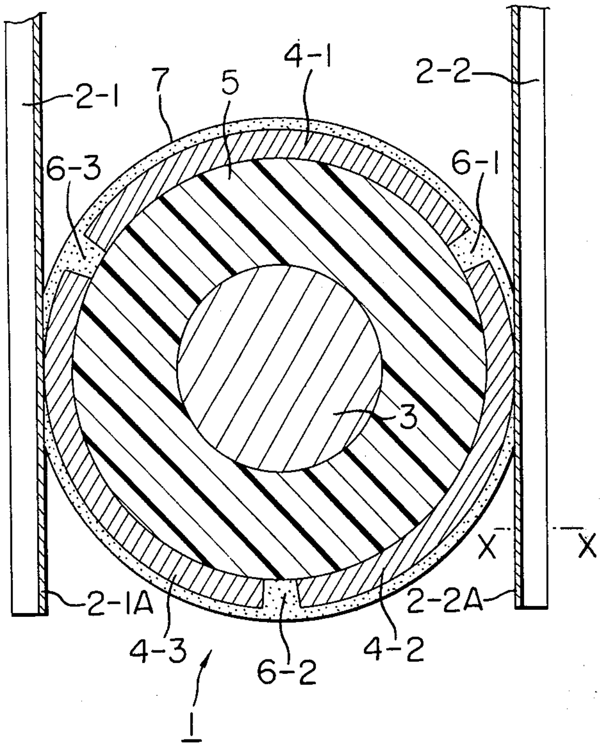
FIG. 1 is an enlarged view of the commutator of a small electric motor embodying this invention.
Figure 2:
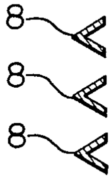
FIG. 2 is a cross-sectional view of a brush taken on line X—X of FIG. 1.

In FIGS. 1 and 2, numeral 1 refers to a commutator; 2-1 and 2-2 to brushes, respectively; 2-1A and 2-2A to edges of brushes 2-1 and 2-2; 3 to a rotating shaft of a rotor; 4-1 through 4-3 to commutator arcuate, segment, respectively; 5 to an insulating cylinder; 6-1 through 6-3 to gaps between each commutator arcuate segment; 7 to a conductive grease to be coated on the commutator surface according to this invention; 8 to a V-shaped sliding portion of the brush, for example, 2-2. The brush 2-1 has the same construction as that of the brush 2-2.

The conductive grease 7 to be coated on the small electric motor of this invention is a product marketed by a Japanese firm called Kanto Kasei Kogyo Co., Ltd. under the brand name of "Conductive Grease, Floil GE-676" which is free of metallic powders, carbon, graphite and other conductive fine particles but has intrinsically a resistance value on the order of 35 kΩ-cm, for example. The resistance value of the grease can be adjusted to 4 kΩ-cm or less, for example, by adding carbon, graphite and other conductive fine particles as necessary. This type of conductive grease has been developed for applications where static electric charge in machinery has to be removed.

Some of the properties of this type of conductive grease will be outlined as follows.

The conductive grease free of carbon and other fine particles has the appearance of milky brown butter. It has a consistency of 350 at 25° C. and does not drip at any temperature, nor produces oil separation. It withstands the copper corrosion test at 100° C×24 hr. Its operating temperature range is −20° C. to 180° C.

The conductive grease containing carbon fine particles has the appearance of black butter and a consistency of 245° at 25° C. with a drip point of over 260° C. It stands the copper corrosion test at 100° C×24 hr. Its operating temperature range is −20° C. to 150° C.

As described at the beginning of this specification, it has been devised that, in a small electric motor having metal brushes 2-1, 2-2 whose sliding portions is formed in a V-shape in cross section so as to cause the edges 2-1A, 2-2A to contact the commutator surface, non-conductive grease is coated on the commutator surface to reduce the sliding friction of the brushes. This invention uses the abovementioned conductive grease in place of the conventional non-conductive grease. The use of conductive grease has many advantages as follows.

(1) The sliding friction of the brushes 2-1 and 2-2 can be reduced as in the case of the conventional non-conductive grease.

(2) The resistance value of the conductive grease 7 according to this invention can be changed as necessary. This enables to reduce the brush pressure required for cutting the grease film to provide electrical conductivity between the brushes 2-1 and 2-2 and the commutator arcuate segments 4-1 through 4-3, compared with the use of the conventional non-conductive grease. This results in further reduction of the sliding friction of the brushes 2-1 and 2-2, compared with the conventional non-conductive grease.

(3) Conductive grease 7 is interposed between the commutator pieces 4-1 through 4-3, particularly in the gaps 6-1 through 6-3. Therefore, by setting the electric resistance of the conductive grease 7 within the optimum range, electric resistance of a given value within the optimum range can be provided between each commutator arcuate segment 4-1 through 4-3 to electrically bridge the commutator pieces. Heretofore, capacitors, resistors having linear characteristics or varistors have often been connected between the commutator pieces 4-1 through 4-3 to prevent spark generation in the commutator 1 and the resultant electrical noises. In such a case, the resistance value of the linear characteristic resistors or the varistor is set to approximately 200 to 300 times that of a rotor coil (not shown) connected between the commutator pieces 4-1 through 4-3, for example, to a value ranging from 0.5 kΩ to 3 kΩ. By the use of the conductive grease, a value on that order can be easily provided without the use of resistors or varistors. In other words, the use of the conductive grease has an effect to suppress parks and electrical noises.

(4) As described above, spark and electrical noise generation can be substantially controlled by the use of the conductive grease according to this invention. This makes it possible to drastically reduce the brush pressure that would have had to be kept at more than a predetermined value to prevent spark generation. With the use of the conductive grease, the brush pressure can be set by taking into account mechanical friction only, and the selecting range of the brush pressure can be substantially expanded.

The lower limit of the resistance value of the conductive grease used in this invention should be selected within a range where the motor efficiency cannot be deteriorated due to the unwanted shortcircuit of the commutator arcuate segments 4-1 through 4-3. However, if the motor efficiency is sacrificed, the electric resistance of the conductive grease can be set to a value as low as that of the coil resistance between the commutator arcuate segments 4-1 through 4-3. In practice, however, the resistance value between the commutator arcuate segments 4-1 through 4-3 is desirable to be on the order of 0.1 kΩ to 5kΩ.

As described above, this invention makes it possible to substantially reduce the electrical wear due to spark generation even under a sufficiently low brush pressure, and accordingly to prevent the mechanical wear of the brushes, and prolong the life of the motor merely by coating coonductive grease on the commutator surface and filling the gaps between the commutator arcuate segments. Since the conductive grease can be coated merely by applying it by hand on assembled motors, it has excellent working efficiency.

What is claimed is:

1. In electric motor with controllable mechanical and electrical wear and comprising a central rotor shaft, an insulating cylinder surrounding said shaft, a commutator surrounding said cylinder and having a plurality of conductive arcuate segments, each of said segments being equally spaced from the adjoining ones by a gap, and a plurality of metal brushes having sliding edges in tangential pressure contact with said arcuate segments, the improvement characterized by an electrically conductive spark-quenching grease coating the outer surface of said arcuate segments and filling said gaps whereby mechanical wear caused by excessive pressure of said brushes on said commutator and spark generation caused by insufficient pressure of said brushes are concurrently and controllably reduced by said grease.

2. The electric motor as set forth in claim 1 wherein the conductive grease is free of metallic powders, carbon, graphite and other conductive fine particles and can be characterized by the following properties: an electrical resistance value of about 35 kΩ-Cm, a visual appearance of milky brown butter, a consistency of 350 at 25° C., the absence of dripping at any temperature, the absence of oil-separation, a resistance to the copper corrosion test at 100° C. for 24 hours, an operating temperature range of from −20° C. to 180° C.

3. The electric motor as set forth in claim 1 wherein the conductive grease contains carbon, graphite and other conductive fine particles.

4. The electric motor as set forth in claim 3, wherein the conductive grease has an electrical resistance of not more than 4 kΩ/cm.

* * * * *